(12) United States Patent
Shimada (10) Patent No.: US 7,636,791 B2
(45) Date of Patent: Dec. 22, 2009

(54) NETWORK INFORMATION DETECTION APPARATUS AND METHOD

(75) Inventor: Masao Shimada, Tokyo (JP)

(73) Assignee: NEC Corporation, Tokyo (JP)

( * ) Notice: Subject to any disclaimer, the term of this patent is extended or adjusted under 35 U.S.C. 154(b) by 991 days.

(21) Appl. No.: 10/802,738

(22) Filed: Mar. 18, 2004

(65) Prior Publication Data

US 2004/0184458 A1    Sep. 23, 2004

(30) Foreign Application Priority Data

Mar. 19, 2003  (JP)  ............... 2003-074846

(51) Int. Cl.
    *G06F 15/16* (2006.01)
(52) U.S. Cl. .................. 709/245; 709/218
(58) Field of Classification Search .......... 709/218, 709/245; 370/242, 245, 402, 392, 401
    See application file for complete search history.

(56) References Cited

U.S. PATENT DOCUMENTS 5,708,654 A * 1/1998 Arndt et al. ............... 370/242
6,925,079 B2   8/2005 Matsukawa
7,085,267 B2 * 8/2006 Carey et al. .............. 370/389
7,181,503 B2 * 2/2007 Choi et al. ................ 709/218
2002/0167914 A1  11/2002 Haneda

FOREIGN PATENT DOCUMENTS

| JP | 6-338884 | 12/1994 |
| JP | 08-147231 | 6/1996 |
| JP | 8-147231 | 6/1996 |
| JP | 2001-244945 A | 9/2001 |
| JP | 2002-190811 A | 7/2002 |
| JP | 2002-190811 A | 7/2002 |
| JP | 2002-335245 A | 11/2002 |

* cited by examiner

*Primary Examiner*—Frantz B Jean
(74) *Attorney, Agent, or Firm*—Foley & Lardner LLP (57) ABSTRACT

Search IP addresses are detected from among a preset number of selected IP addresses available on the network, and DNS query message and ICMP echo request message are transmitted at a time to the detected search IP addresses. DNS server and router IP addresses are detected from response messages in response to the DNS query message and the ICMP echo request message.

5 Claims, 11 Drawing Sheets

| 0 | 7 | 8 | 15 | 16 | 31 |
|---|---|---|---|---|---|
| TYPE | | CODE | | CHECKSUM | |
| ID | | | SEQUENCE | | |
| DATA | | | | | |

TYPE = 0 : ECHO REPLY
       8 : ECHO REQUEST

FIG. 10B

| 0 | 7 | 8 | 15 | 16 | 31 |
|---|---|---|---|---|---|
| TYPE | | CODE | | CHECKSUM | |
| UNUSED (0) | | | | | |
| FIRST 64 BITS OF HEADER AND DATA OF ORIGINAL DATAGRAM | | | | | |

TYPE = 11 : TIME EXCEEDED FOR A DATAGRAM

FIG. 10C

| 0 | 7 | 8 | 15 | 16 | 31 |
|---|---|---|---|---|---|
| TYPE | | CODE | | CHECKSUM | |
| ROUTER IP ADDRESS | | | | | |
| FIRST 64 BITS OF HEADER AND DATA OF ORIGINAL DATAGRAM | | | | | |

TYPE = 5 : REDIRECT

FIG. 11

OPECODE = 1 : ARP REQUEST
2 : ARP RESPONSE
8 : InARP REQUEST
9 : InARP RESPONSE

FIG. 12

NETWORK INFORMATION DETECTION APPARATUS AND METHOD

BACKGROUND OF THE INVENTION

1. Field of the Invention

The present invention relates generally to a network system, and more particularly to a network information detection apparatus for and method of automatically acquiring network information.

2. Description of the Related Art

To connect a computer to a network, one must set network information such as router IP (Internet Protocol) address and DNS (Domain Name System) IP address to the computer. While such information may be set manually, manual setting requires network knowledge and time and effort must be expended to investigate network information. Erroneous setting of network information may send the entire network into a tailspin.

In the presence of a DHCP (Dynamic Host Configuration Protocol) server, on the other hand, network information can be acquired from the DHCP server. To thus allow automatic acquisition of network information, however, a server must be built that is intended to provide network information.

Japanese Patent Application Unexamined Publication No. 2002-190811 discloses as an example a method of automatically acquiring IP addresses of networked devices. According to the prior art method, when network information cannot be obtained from DHCP server, an effective subnet is determined by analyzing network traffic (see paragraph Nos. 0018 to 0021) and, within the subnet, the default router and the DNS server are detected respectively using an ICMP (Internet Control Message Protocol) router selection message and a SNMP (Simple Network Management Protocol) DNS find request (paragraph Nos. 0025 to 0027).

However, the IP configuration automatic acquisition method as disclosed in the above publication uses the router IP address detection method described in RFC1256 as it is and does not consider speeding up router detection. Besides, some routers do not support ICMP Router Selection, occasionally resulting in routers not being detected by the prior art method.

Similarly, the aforementioned prior art method does not consider speeding up DNS server detection. Besides, some DNS servers do not support SNMP's DNS find request, occasionally resulting in DNS servers not being detected.

SUMMARY OF THE INVENTION

It is therefore an object of the present invention to provide a network information detection apparatus and method capable of automatically and rapidly acquiring network information without needing any server functions for providing network information.

It is another object of the present invention to provide a network information detection apparatus and method capable of reliably acquiring network information.

According to a first aspect of the present invention, an IP address of a device connected to a network is detected by the following: a search IP address detector for detecting at least one search IP address from IP addresses which are selected every a predetermined number of IP addresses as a unit from possible IP addresses on the network; an IP address detector for detecting an IP address of a target device from the at least one search IP address detected; and a controller for terminating a network information detection operation either when all possible IP addresses on the network have been selected or when the IP address of the target device has been detected.

According to a second aspect of the present invention, an IP address on a network including at least a DNS (Domain Name System) server is detected by the following: a search IP address detector for detecting at least one search IP address from possible IP addresses on the network; a DNS message communication section for sending a DNS query message to the at least one search IP address and receiving a response message to the DNS query message; and a DNS server detector for discriminating a DNS response message from the response message to detect an IP address of a DNS server originating the DNS response message.

The search IP address detector may send an ARP (Address Resolution Protocol) request at a time to IP addresses which are selected every a predetermined number of IP addresses as a unit from the possible IP addresses on the network, and detect the at least one search IP address from an ARP response to the ARP request.

The DNS query message may be a message with resetting QR bit of DNS protocol header, which is a message of at least one type selected from a group of standard query, inverse query, server status request and update.

The network information detection apparatus as described above further includes an ICMP message communication section for sending an ICMP echo query message to the at least one search IP address and receiving an ICMP response message to the ICMP echo query message; and a router detector for detecting an IP address of a router originating the ICMP response message. The ICMP response message may be one of an ICMP redirect request message and an ICMP time exceed message.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE PREFERRED EMBODIMENTS

Figure 1:
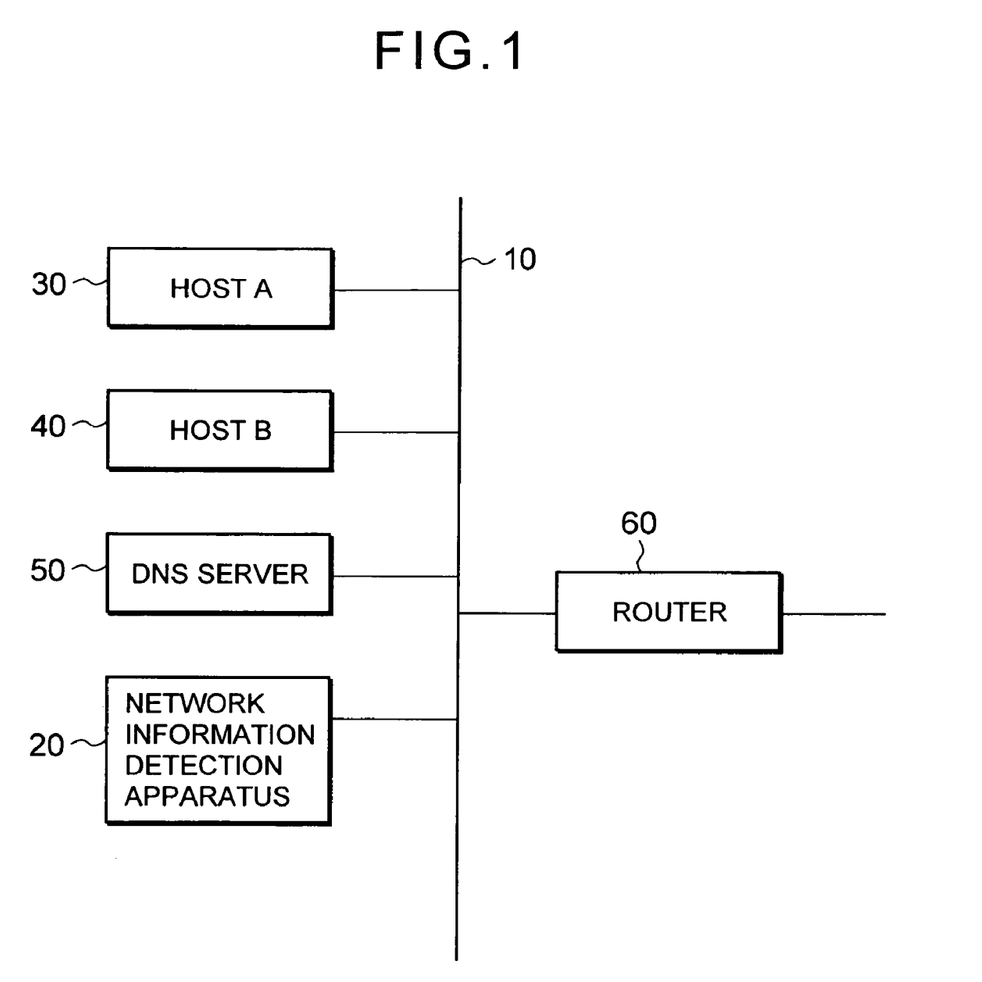
FIG. 1 is a schematic configuration diagram showing an example of network including a network information detection apparatus according to the present invention.

Referring to FIG. 1, a plurality of network devices are connected to a network transmission line 10, including a network information detection apparatus 20, a host A 30, a host B 40, a DNS server 50 and a router 60. The network information detection apparatus 20 according to the present invention detects the DNS server 50 and/or the router 60 from this subnet.

Figure 2:
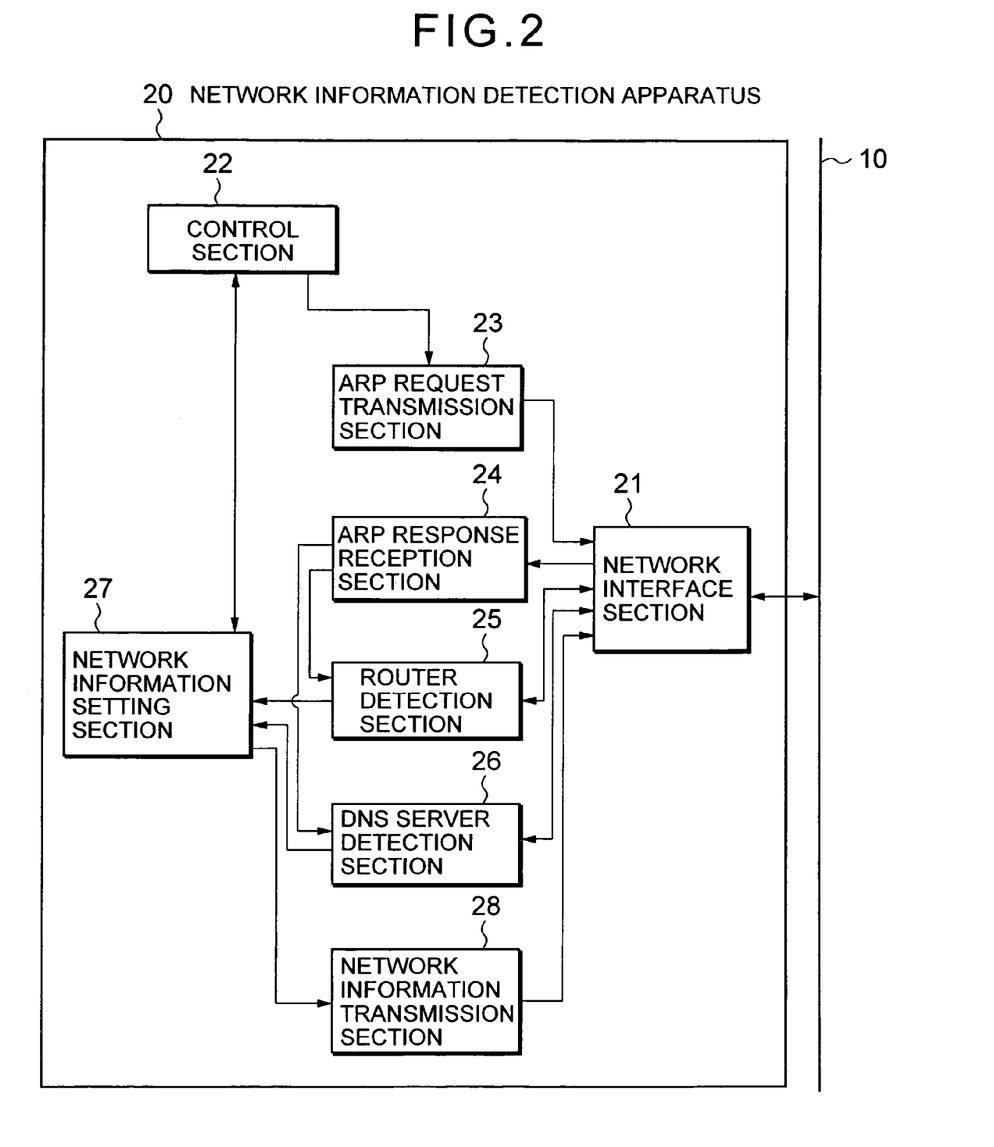
FIG. 2 is a block configuration diagram showing a network information detection apparatus according to a first embodiment of the present invention.

As shown in FIG. 2, the network information detection apparatus 20 according to the present embodiment has a network interface section 21 for connection to the network transmission line 10. The network interface section 21 is connected to an ARP request transmission section 23, an ARP reply reception section 24, a router detection section 25, a DNS server detection section 26 and a network information transmission section 28, which are used to transmit/receive IP and ARP packets as described later. The ARP reply reception section 24 is connected as described later to the router detection section 25 and the DNS server detection section 26, whereas the router detection Section 25, the DNS server detection section 26 and the network information transmission section 28 are respectively connected to a network information setting section 27. The overall operation of the network information detection apparatus 20 is controlled by a control section 22.

Figure 7:
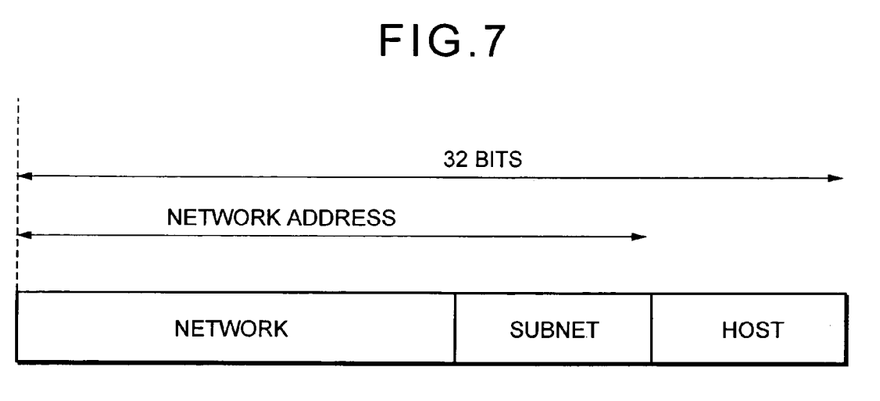
FIG. 7 illustrates an IP address format.

Under the control of the control section 22, the ARP request transmission section 23 repeatedly transmits ARP request packets to a predetermined number of IP addresses within the subnet, which will be described in detail later. It is to be noted that the IP address format and the ARP request packet format are illustrated respectively in FIGS. 7 and 11. In FIG. 7, the subnet mask is a string of values with all bits in the network part and the subnet part being set and all bits in the host part being reset. The subnet refers to a logical network capable of communication in the IP layer without routing. As for IP addresses in a subnet, network addresses are identical, with only the host parts being different from one another.

Figure 11:
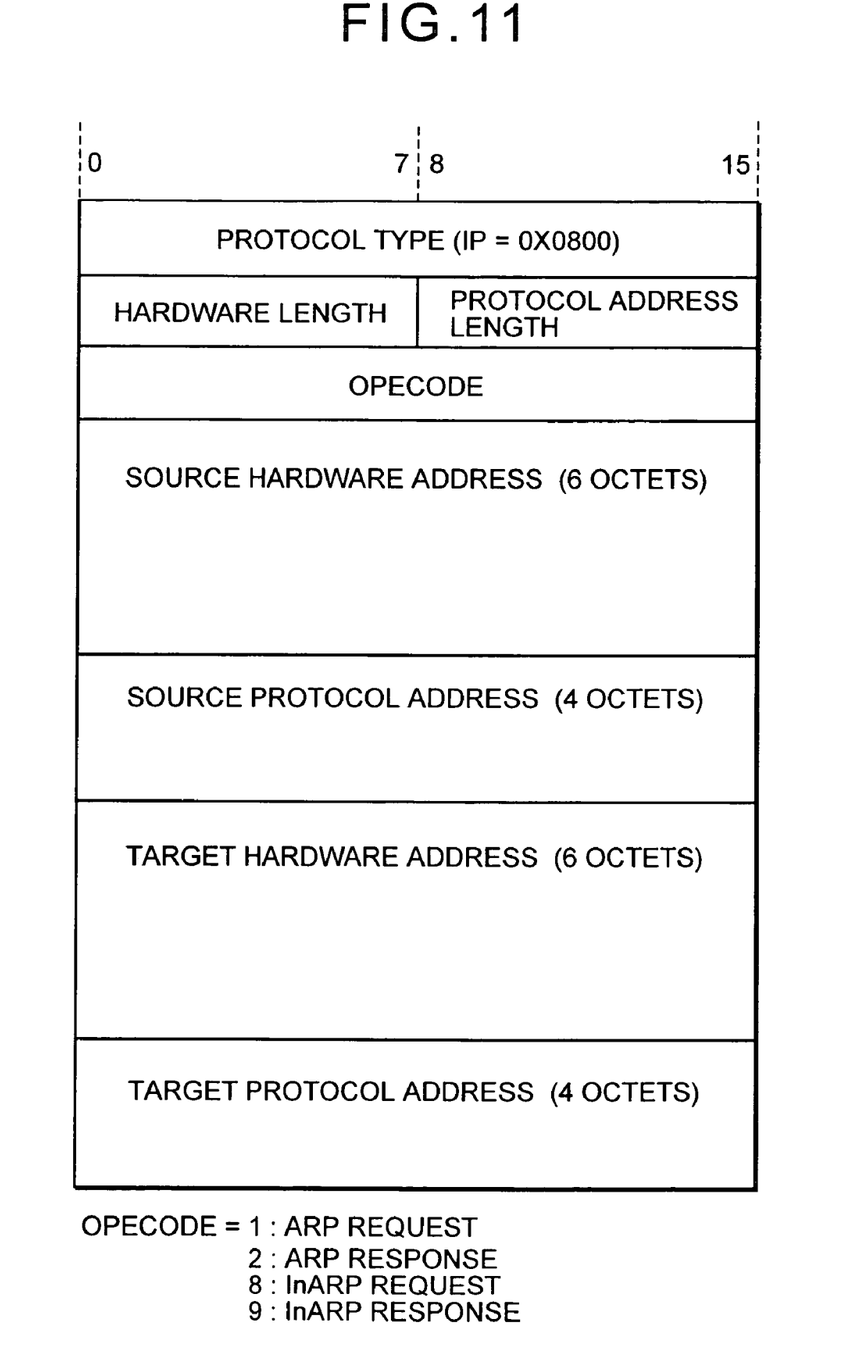
FIG. 11 illustrates an ARP packet format.
Figure 12:
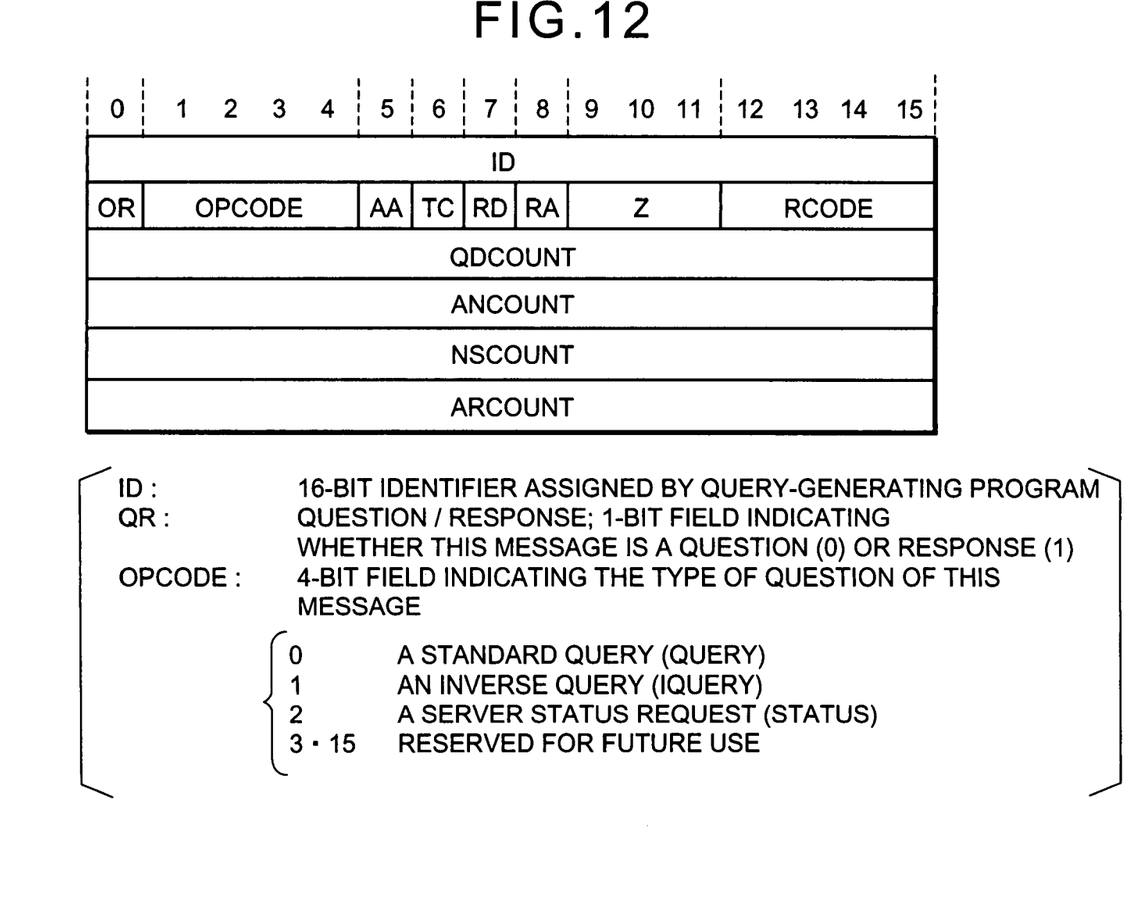
FIG. 12 illustrates a DNS protocol header format.

The ARP reply reception section 24 receives an ARP reply packet from the host A 30, the host B 40, the DNS server 50 or the router 60 as a reply to the ARP request packet transmitted by the ARP request transmission section 23. The source IP address of the ARP reply packet is output to the router detection section 25 and the DNS server detection section 26. The ARP reply packet format is shown in FIG. 11.

Assuming the source IP address, input from the ARP reply reception section 24, to be a router detection target IP address, the router detection section 25 detects the router 60 by repeating router feature check for each of the preset number of router detection target IP addresses (details given later). The IP address of the detected router 60 is output to the network information setting section 27.

Assuming the source IP address, input from the ARP reply reception section 24, to be a DNS server detection target IP address, the DNS server detection section 26 detects the DNS server 50 by repeating DNS server feature check for each of the preset number of DNS server detection target IP addresses (details given later). The IP address of the detected DNS server 50 is output to the network information setting section 27.

The network information setting section 27 outputs to the network information transmission section 28 at least one of the router IP address detected by the router detection section 25 and the DNS server IP address detected by the DNS server detection section 26 so that the address or addresses can be set to its own apparatus or that the address or addresses can be used in other network devices.

The network information transmission section 28 transmits the router IP address and/or the DNS server IP address, input from the network information setting section 27, via the network interface section 21 so that the address or addresses can be used in other network devices.

Figure 8:
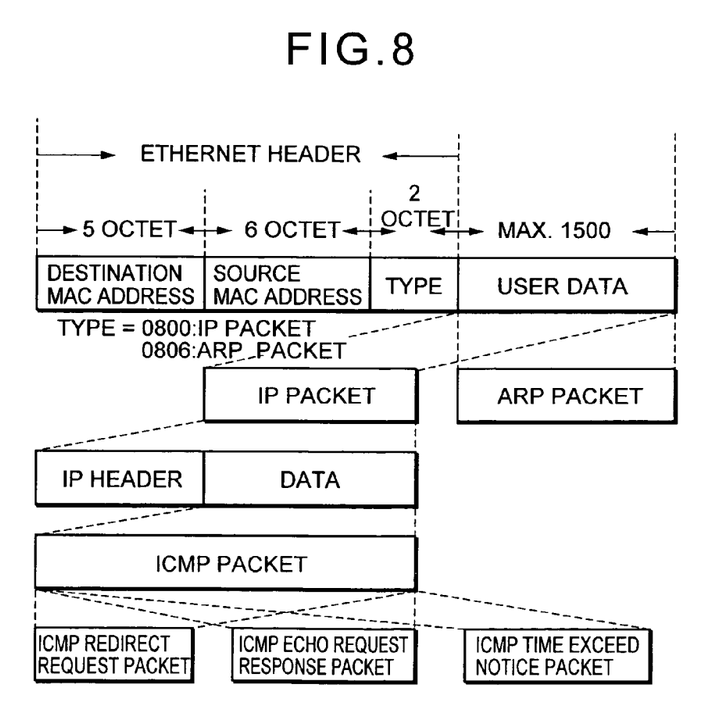
FIG. 8 illustrates an Ethernet packet format.
Figure 9:
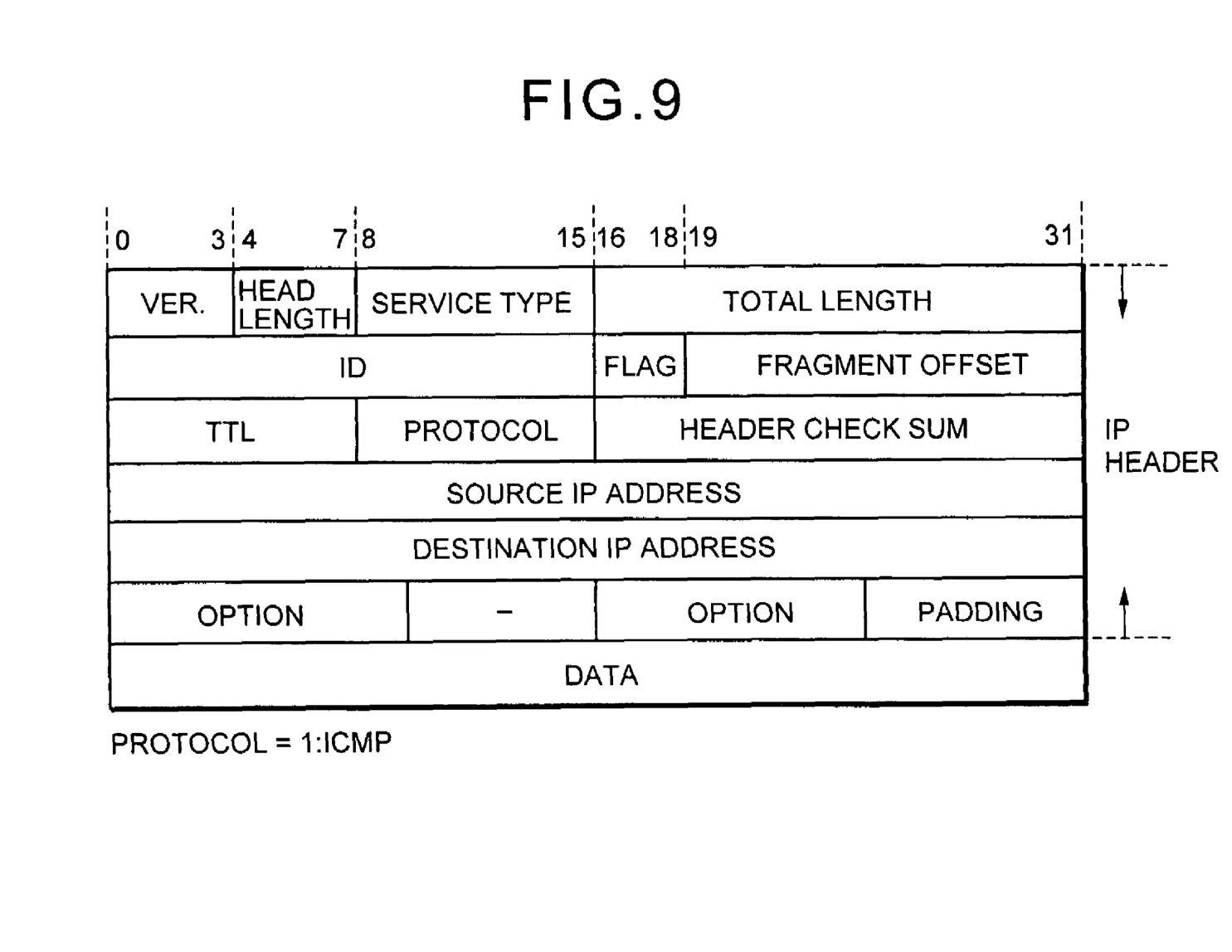
FIG. 9 illustrates an IP packet format.
Figure 10A:
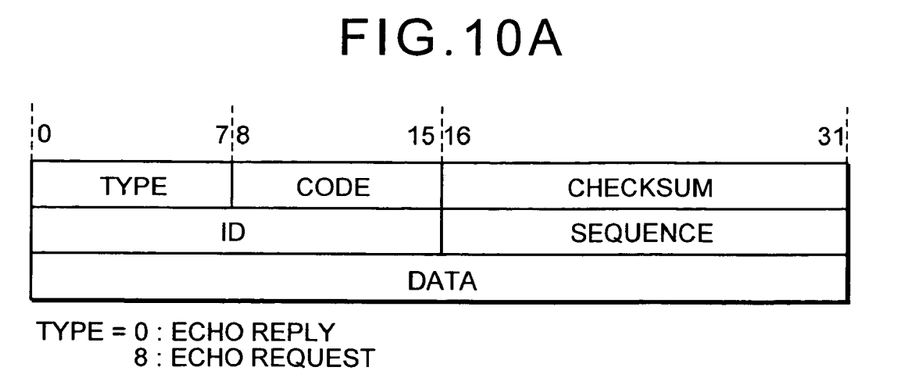
FIG. 10A illustrates an ICMP echo request/response packet format.
Figure 10B:
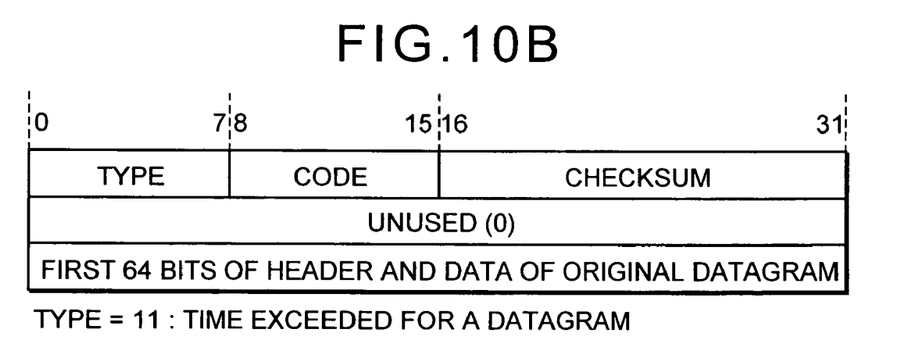
FIG. 10B illustrates an ICMP Time Exceed notice, packet format.
Figure 10C:
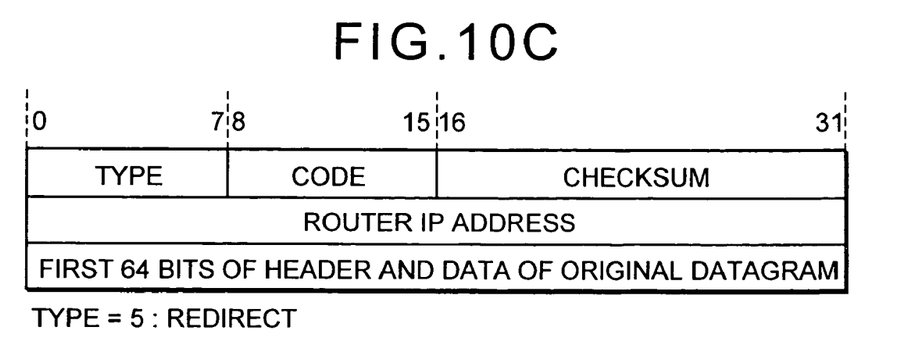
FIG. 10C illustrates an ICMP redirect packet format.

A packet flowing over the network transmission line 10 takes the format of a data link layer packet shown in FIG. 8 when the LAN is Ethernet (registered trademark, IEEE 802.3), takes the format shown in FIG. 9 in the case of an IP packet and takes the format shown in FIG. 11 in the case of an ARP packet.

Although being provided with both the router detection section 25 and the server detection section 26, the network information detection apparatus 20 may be provided with only either of the two.

It is to be noted that while not shown in FIG. 2, a service detection section may be provided in the network information detection apparatus 20 according to the present embodiment so as to detect the IP address of a device performing a service or function other than the above on the network.

Network Information Detecting Operation

A detailed description will be given below of the operation of the present embodiment with reference to the flowcharts shown in FIGS. 3 to 5 and the packet formats shown in FIGS. 8 to 12.

Figure 3:
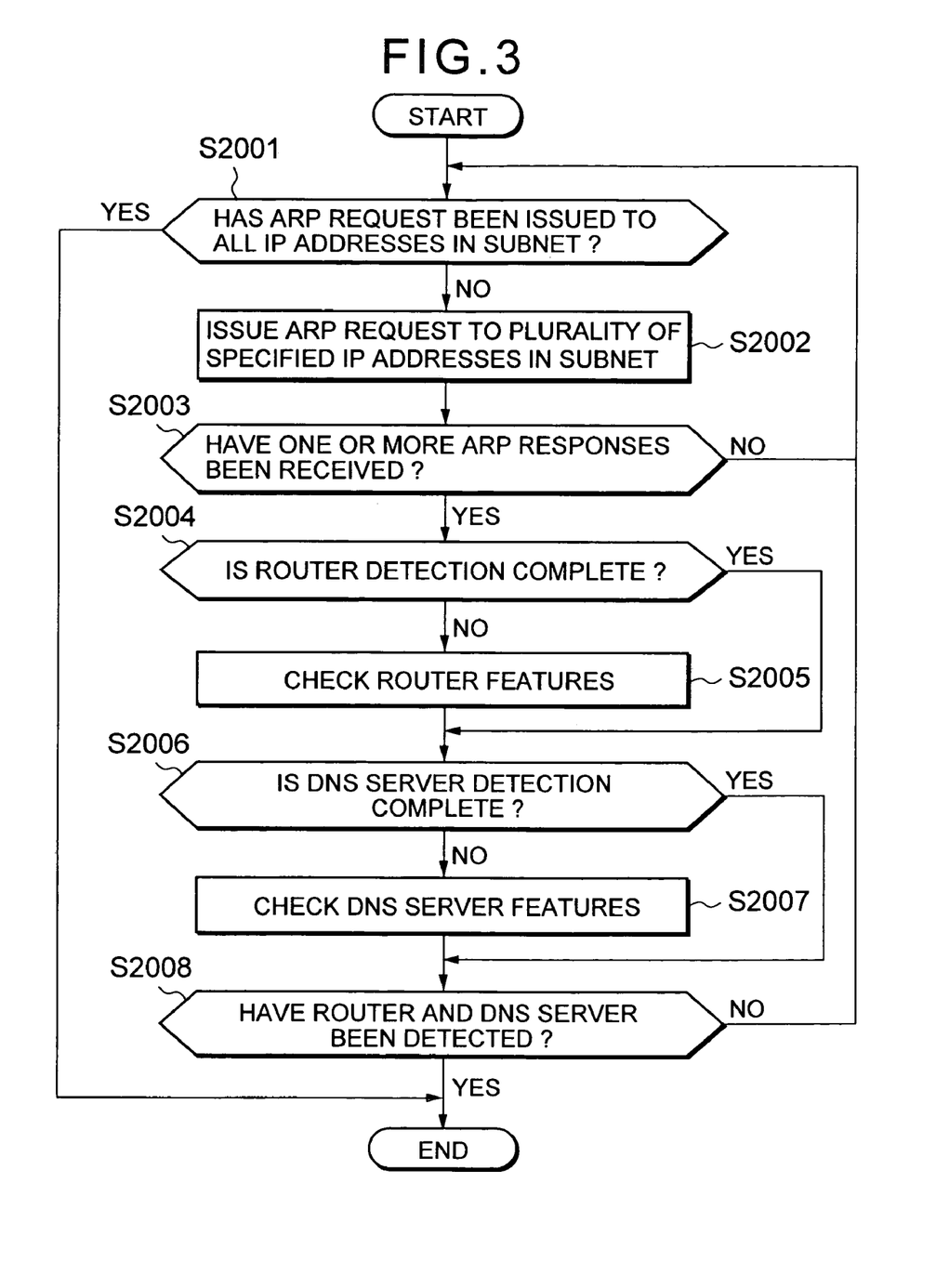
FIG. 3 is a flowchart showing as a whole the router/DNS server detection operation of the first embodiment according to the present invention.

Referring to FIG. 3, first, the control section 22 determines, based on subnet information stored in advance, whether the ARP request transmission section 23 has issued an ARP request packet (refer to FIG. 11) to all the IP addresses in the subnet (Step S2001). If it is true (YES of step S2001), the operation is terminated.

If the ARP request packet has not been issued to all the IP addresses in the subnet (No in Step S2001), the ARP request packet will be issued collectively to every the preset number of IP addresses in the subnet (Step S2002). More specifically, if we assume that the subnet mask is 255.255.255.0, the network address 192.168.1.0 and the number of IP addresses to which the ARP request packet is sent at a time is 100, then the ARP request packet is transmitted to IP addresses from 192.168.1.1 to 192.168.1.100 at the first execution of Step S2002, to IP addresses from 192.168.1.101 to 192.168.1.200 at the second execution and to IP addresses from 192.168.1.200 to 192.168.1.254 at the third execution.

The control section 22 determines whether one or more ARP reply packets (refer to FIG. 11) have been received as a reply to the ARP request (Step S2003) and returns to Step S2001 if there have been no ARP replies (No in Step S2003).

When one or more ARP reply packets (refer to FIG. 11) have been received (Yes in Step S2003), the control section 22 determines whether router detection is complete (Step S2004). If router detection is not complete (No in Step S2004), the control section 22 performs router feature check (Step S2005). When router detection is complete (Yes in Step S2004), the control section 22 skips router feature check and determines whether DNS server detection is complete (Step S2006).

If DNS server detection is not complete (No in Step S2006), the control section 22 performs DNS server feature check (Step S2007). When DNS server detection is complete (Yes in Step S2006), the control section 22 skips DNS server feature check and determines whether the router and the DNS server have been detected (Step S2008).

When the router and the DNS server have been detected (Yes in Step S2008), the control section 22 terminates the processing. If the router and the DNS server have not been detected (No in Step S2008), the control section 22 returns to Step S2001 and repeats the above operation until the ARP request packet is issued to all the IP addresses in the subnet or until the router and the DNS server are detected.

It is to be noted that if a service detection section is provided, an ARP request packet may be issued at a time to the preset number of IP addresses in the subnet, thus performing service or function detection to the source IP address contained in each ARP reply packet that is a reply to the ARP request packet issued.

(1) Router Feature Check

Figure 4:
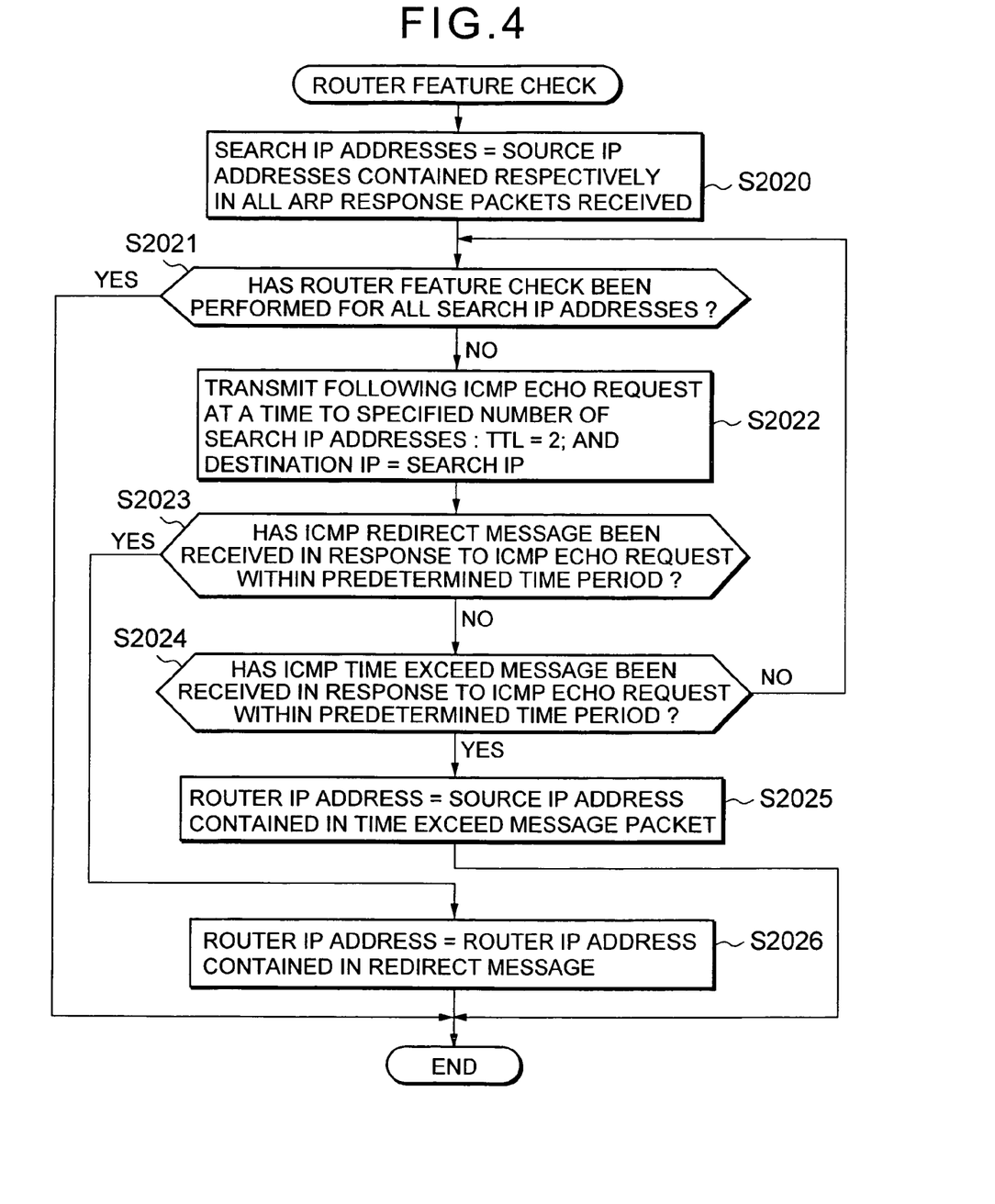
FIG. 4 is a flowchart showing an example of the router feature check operation carried out by a router detection section in the first embodiment of the present invention.

In FIG. 4, IP addresses to be searched for routers are source IP addresses contained respectively in all the ARP reply packets received by the ARP reply reception section 24. When these router search IP addresses are entered (Step S2020), it is determined whether router feature check has been performed for all the router search IP addresses (Step S2021). When router feature check is complete for all the IP addresses (Yes in Step S2021), the router detection section terminates the router feature check operation.

If some router search IP addresses have yet to be inspected (No in Step S2021), an ICMP echo request packet (refer to FIG. 10A), with its TTL (Time to Live) set in advance to a desired value, is transmitted at a time to the preset number of router search IP addresses (Step S2022). Here, TTL is assumed to be 2, that is, the number of router steps through which a packet can pass is assumed to be 2.

For example, if the router search IP addresses are from 192.168.1.10 to 192.168.1.24 and from 192.168.1.40 to 192.168.1.51 and if router feature check is conducted collectively on ten IP addresses, Step S2022 is executed by transmitting an ICMP echo request at a time to IP addresses from 192.168.1.10 to 192.168.1.19 at the first execution, to IP addresses from 192.168.1.20 to 192.168.1.24 and from 192.168.1.40 to 192.168.1.44 at the second execution and to IP addresses from 192.168.1.45 to 192.168.1.51 at the third execution.

After the ICMP echo request packet has been transmitted collectively, the router detection section 25 determines whether an ICMP redirect message (refer to FIG. 10C) is received within a predetermined time period in response to the ICMP echo request packet (Step S2023).

If no ICMP redirect message has been received (No in Step S2023), the router detection section 25 determines whether an ICMP Time Exceed message (FIG. 10B) has been received within a predetermined time period in response to the ICMP echo request (Step S2024). If no ICMP Time Exceed message has been received (No in Step S2024), the control of the router detection section 25 returns to Step S2021. When the ICMP Time Exceed message has been received within a predetermined time period (Yes in Step S2024), the router detection section 25 terminates the router feature check operation, concluding that the source IP address contained in the Time Exceed message packet is the router IP address (Step S2025).

When the ICMP redirect message has been received (Yes in Step S2023), the router detection section 25 terminates the router feature check operation, concluding that the router IP address contained in the ICMP redirect message is the router IP address (Step S2026).

Thus, router detection is carried out by ICMP redirect and ICMP Time Exceed message received within a predetermined time period after transmission of ICMP echo request packet that is a packet whose TTL is set to a given value, ensuring fast router detection. Besides, routers always support the ICMP Time Exceed message function, allowing reliable router detection.

(2) DNS Server Feature Check

Figure 5:
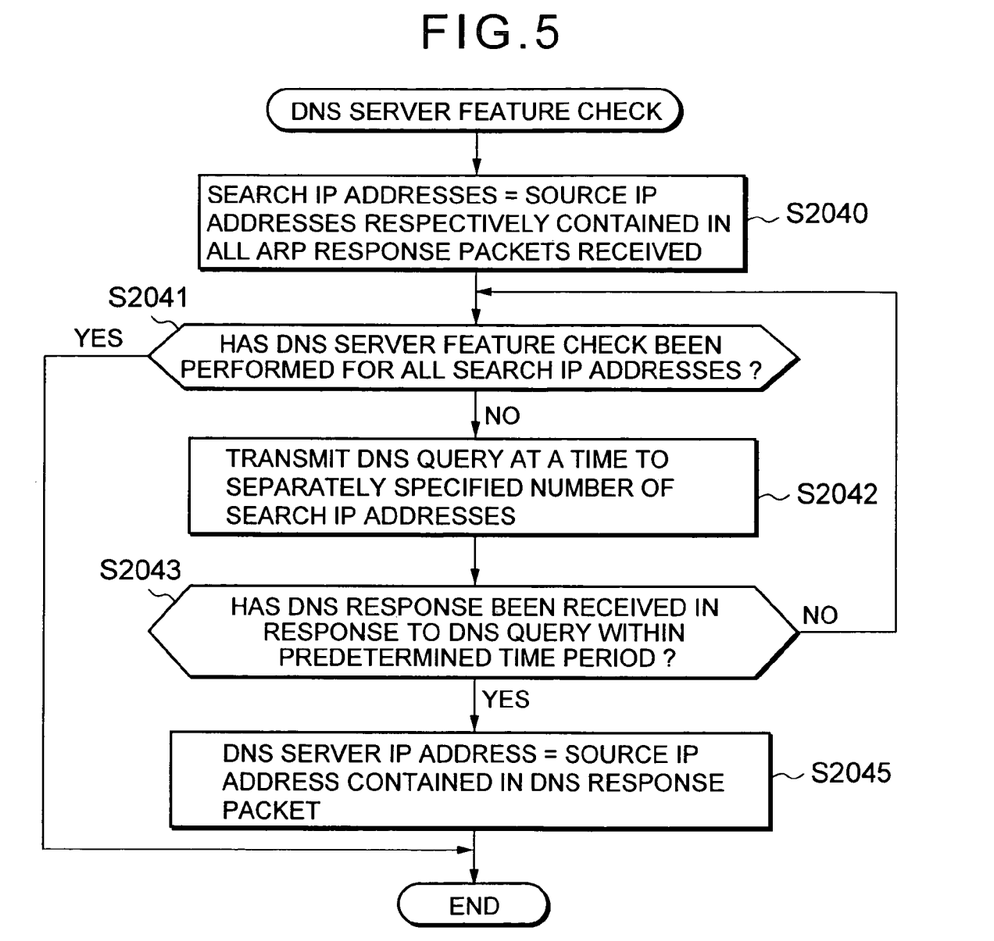
FIG. 5 is a flowchart showing an example of the DNS server feature check operation carried out by a DNS server detection section in the first embodiment of the present invention.

Referring to FIG. 5, first, IP addresses to be searched for DNS server are source IP addresses contained respectively in all the ARP reply packets received by the ARP reply reception section 24. When these DNS server search IP addresses are entered (Step S2040), the DNS server detection section 26 determines whether DNS server feature check has been performed for all the DNS server search IP addresses (Step S2041). When DNS server feature check is complete for all the IP addresses (Yes in Step S2041), the DNS server detection section 26 terminates the DNS server feature check operation.

If some DNS server search IP addresses have yet to be inspected (No in Step S2041), a DNS query (refer to FIG. 12), with its QR (Question/Response) bit reset, is transmitted at a time to a preset number of DNS server search IP addresses (Step S2042). This DNS query with reset QR bit is a query message such as a standard query (OPCODE=0), inverse query (OPCODE=1), server status request (OPCODE=2) or update.

As for collective transmission, for example, if the DNS server search IP addresses are from 192.168.1.10 to 192.168.1.24 and from 192.168.1.40 to 192.168.1.51 and if DNS server feature check is conducted collectively on ten IP addresses, the DNS query is transmitted at a time to IP addresses from 192.168.1.10 to 192.168.1.19 at the first execution, to IP addresses from 192.168.1.20 to 192.168.1.24 and from 192.168.1.40 to 192.168.1.44 at the second execution and to IP addresses from 192.168.1.45 to 192.168.1.51 at the third execution.

When the DNS query is transmitted at a time, the DNS server detection section 26 determines whether a DNS response has been received within a predetermined time period in response to the DNS query (Step S2043). If no reply has been received (No in Step S2043), the control of the DNS server detection section 26 returns to Step S2041. When a DNS response has been received within a predetermined time period in response to the DNS query (Yes in Step 2043), the DNS server detection section 26 terminates the DNS server feature check operation, concluding that the source IP address contained in the DNS response packet is the DNS server IP address (Step S2045).

Thus, DNS server detection is carried out by response received within a predetermined time period after transmission of DNS protocol query message, ensuring fast router detection. Besides, DNS servers always support the response function to respond to a received query message, allowing reliable DNS server detection.

Figure 6:
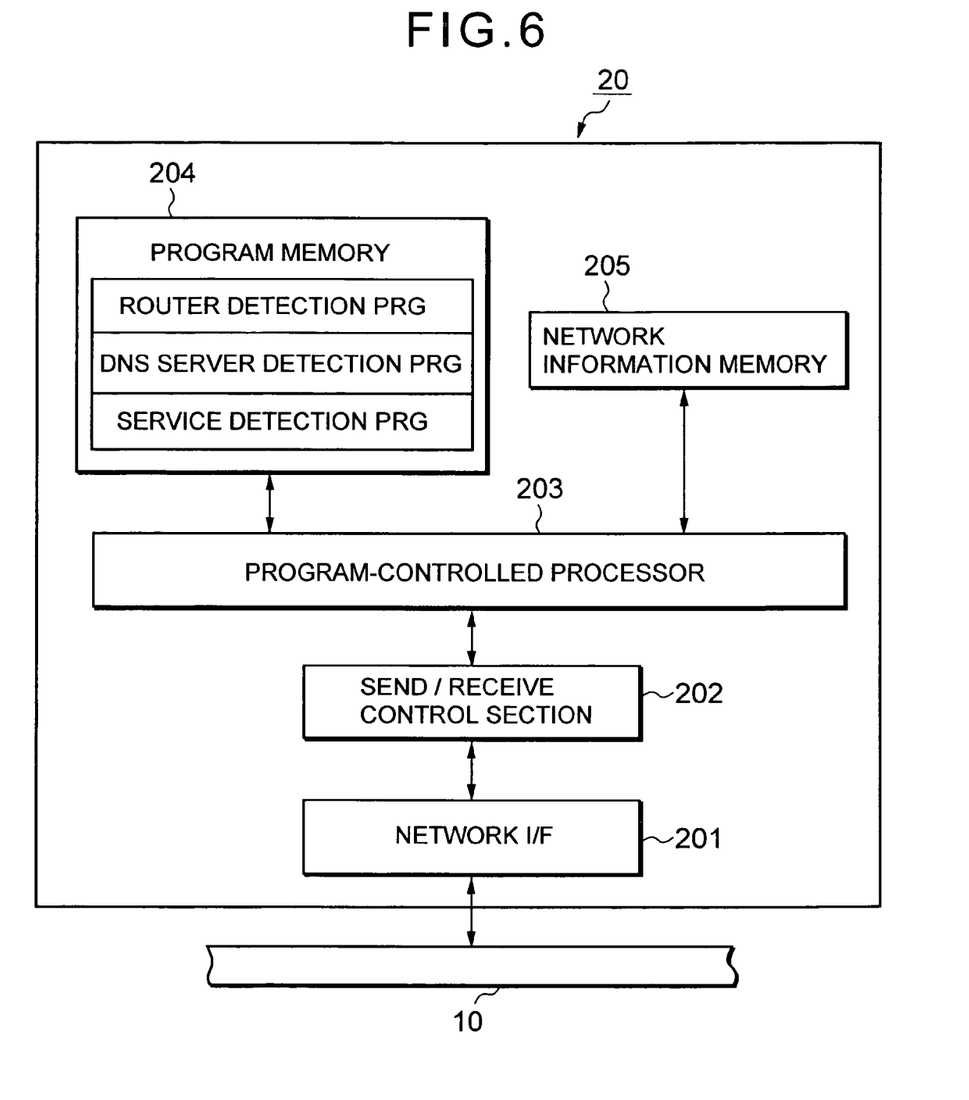
FIG. 6 is a block configuration diagram showing a network information detection apparatus according to a second embodiment of the present invention.

As shown in FIG. 6, the network information detection apparatus 20 according to a second embodiment of the present embodiment includes a network interface 201 for connection to the network transmission line 10 and a send/receive control section 202 for transmitting/receiving IP or ARP packets described above, and a program-controlled processor 203 controlling the detection and setting of network information discussed earlier.

The program-controlled processor 203 runs router and DNS server detection programs and necessary service detection programs read from a program memory 204, allowing the network information detection operation as shown in FIGS. 3 to 5. Network information thus detected is stored in a network information memory 205 and is set to its own apparatus. Alternatively, network information is transmitted for setting of other networked devices. Description of the network information detection operation, carried out by the program-controlled processor 203, will be omitted here since the operation has been described already with reference to FIGS. 3 to 5.

As described above in detail, according to the present invention, it is possible to ensure fast IP address detection by successively selecting a preset number of IP addresses from among available IP addresses on the network, detecting search IP addresses from a selected set of the preset number of IP addresses, and detecting the IP address of an intended target device from the detected search IP addresses.

Further, according to the present invention, it is possible to ensure fast router detection thanks to router detection by ICMP redirect request and ICMP Time Exceed message that are replies to ICMP echo request. Additionally, routers always support the ICMP Time Exceed message function, allowing reliable router detection.

In addition, according to the present invention, it is possible to ensure fast DNS server detection thanks to DNS server detection by response to DNS protocol query message. Additionally, DNS servers always support the response function to respond to query message, allowing reliable DNS server detection.

Thus, fast and automatic detection of DNS server and router IP addresses reduces wait time for users, eliminates the manual tasks of entering a DNS server/router IP address by users and prevents confusion in the network or upsurge in load as a result of erroneous address entry. The network information detection apparatus according to the present invention is particularly effective for connecting a network device, purchased from a distributor, to the user network and moving a network device from one network to another.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

The invention claimed is:

1. An apparatus for detecting an IP (Internet Protocol) address on a network including at least a DNS (Domain Name System) server, comprising:
    a search IP address detector for detecting at least one search IP address from IP addresses which are
    a predetermined number of IP addresses selected as a unit from possible IP addresses on the network, by sending an ARP (Address Resolution Protocol) request to the IP addresses and receiving an ARP response to the ARP request;
    a DNS message transceiver for sending a DNS query message to the at least one search IP address and receiving response message;
    a DNS server detector for identifying a DNS response message from the response message and detecting an IP address of a source DNS server from the DNS response message;
    an ICMP message transceiver for sending an ICMP echo request message to the at least one search IP address and receiving ICMP response message; and
    a router detector for detecting an IP address of a source router from the ICMP response message, wherein the ICMP response message is either an ICMP redirect request message or an ICMP time exceed message.

2. The apparatus according to claim 1, wherein the IP address detector further includes a service detector for detecting an IP address of a device providing a service other than services of the DNS server and the router.

3. The apparatus according to claim 1, wherein the DNS query message is a message with resetting QR bit of DNS protocol header, which is a message of at least one type selected from a group of standard query, inverse query, server status request and update.

4. A method for detecting an IP (Internet Protocol) address on a network including at least a DNS (Domain Name System) server, comprising:
    detecting at least one search IP address from IP addresses which are a predetermined number of IP addresses selected as a unit from possible IP addresses on the network, by sending an ARP (Address Resolution Protocol) request to the IP addresses and receiving an ARP response to the ARP request;
    sending a DNS query message to the at least one search IP address and receiving response message;
    identifying a DNS response message from the response message and detecting an IP address of a source DNS server from the DNS response message;
    sending an ICMP echo request message to the at least one search IP address and receiving ICMP response message; and
    detecting an IP address of a source router from the ICMP response message, wherein the ICMP response message is either an ICMP redirect request message or an ICMP time exceed message.

5. A program instructing a computer to a network, including at least a DNS (Domain Name System) server, information detection operation for detecting an IP (Internet Protocol) address, comprising the steps of:
    detecting at least one search IP address from IP addresses which are a predetermined number of IP addresses selected as a unit from possible IP addresses on the network, by sending an ARP (Address Resolution Protocol) request to the IP addresses and receiving an ARP response to the ARP request;
    sending a DNS query message to the at least one search IP address and receiving response message;
    identifying a DNS response message from the response message and detecting an IP address of a source DNS server from the DNS response message;
    sending an ICMP echo request message to the at least one search IP address and receiving ICMP response message; and
    detecting an IP address of a source router from the ICMP response message, wherein the ICMP response message is either an ICMP redirect request message or an ICMP time exceed message.

* * * * *

UNITED STATES PATENT AND TRADEMARK OFFICE
CERTIFICATE OF CORRECTION

| | | |
|---|---|---|
| PATENT NO. | : 7,636,791 B2 | |
| APPLICATION NO. | : 10/802738 | |
| DATED | : December 22, 2009 | |
| INVENTOR(S) | : Shimada | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1360 days.

Signed and Sealed this
Eleventh Day of January, 2011

David J. Kappos
*Director of the United States Patent and Trademark Office*